(12) United States Patent
Kato (10) Patent No.: US 9,599,078 B2
(45) Date of Patent: Mar. 21, 2017

(54) FUEL SUPPLY DEVICE

(71) Applicant: DENSO CORPORATION, Kariya, Aichi-pref. (JP)

(72) Inventor: Masaaki Kato, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/956,652

(22) Filed: Dec. 2, 2015

(65) Prior Publication Data

US 2016/0201629 A1 Jul. 14, 2016

(30) Foreign Application Priority Data

Jan. 13, 2015 (JP) .................................... 2015-4511

(51) Int. Cl.

| F02M 55/00 | (2006.01) |
|---|---|
| F02M 59/44 | (2006.01) |
| F16N 15/00 | (2006.01) |
| F16J 15/00 | (2006.01) |
| F02M 63/02 | (2006.01) |

(52) U.S. Cl.
CPC ........ *F02M 55/002* (2013.01); *F02M 55/004* (2013.01); *F02M 59/44* (2013.01); *F02M 59/445* (2013.01); *F16J 15/004* (2013.01); *F16N 15/00* (2013.01); *F02M 63/0215* (2013.01)

(58) Field of Classification Search
CPC ...... F04B 39/02; F04B 39/0276; F04B 53/18; F02M 55/002; F02M 55/00; F02M 55/004; F02M 59/44
See application file for complete search history.

(56) References Cited

U.S. PATENT DOCUMENTS

| 6,003,495 A * | 12/1999 | Tipton | ................... | F02M 55/00 |
| | | | | 123/467 |
| 2014/0165957 A1* | 6/2014 | Kwun | .................... | F02M 59/44 |
| | | | | 123/196 R |

FOREIGN PATENT DOCUMENTS

| JP | H07-208330 A | 8/1995 |
|---|---|---|
| JP | 2003-206825 | * 7/2003 |
| JP | 2003-206825 A | 7/2003 |
| JP | 4707156 B2 | 6/2011 |

\* cited by examiner

*Primary Examiner* — Jacob Amick

(57) ABSTRACT

A fuel supply device includes a leaked fuel collection unit and a check valve. When fuel passes through a first seal member to leak out from a cam chamber into an inter-seal space, the leaked fuel collection unit sucks in this fuel to extract the fuel from the inter-seal space, then pressurizes and returns the fuel to a fuel tank. The check valve prevents the fuel from flowing in reverse from the fuel tank to the inter-seal space. Accordingly, regardless of the pressure in the fuel tank and the pressure in the inter-seal space, fuel that leaks into the inter-seal space may be actively returned to the fuel tank. Further, the check valve prevents pressure in the fuel tank from acting on seal members. Accordingly, fuel that leaks into the inter-seal space may be collected into the fuel tank.

3 Claims, 7 Drawing Sheets

FUEL SUPPLY DEVICE

CROSS REFERENCE TO RELATED APPLICATION

The present application is based on Japanese Patent Application No. 2015-004511 filed on Jan. 13, 2015, disclosure of which is incorporated herein by reference.

TECHNICAL FIELD

The present disclosure relates to a fuel supply device for supplying liquefied gas fuel to a combustion chamber of an engine.

BACKGROUND

Fuel supply devices for supplying liquefied gas fuel to a combustion chamber of an engine are conventionally known. One example of such a fuel supply device includes a feed pump that sends fuel from a fuel tank to a high pressure pump. The fuel is compressed by the high pressure pump, sent through a common rail, and supplied into the combustion chamber of the engine by an injector.

Such a high pressure pump is known to include a camshaft, a cam, a housing, a cam reception hole, and a seal member, as explained below.

The camshaft is driven by an internal combustion engine to rotate.

The cam disposed on the camshaft that drives a plunger.

The housing houses the cam, and forms a cam chamber that receives fuel for lubricating the cam.

The camshaft reception hole is formed in the housing and penetrates from inside of the cam chamber to outside of the cam chamber. The camshaft is inserted into the camshaft reception hole, and is retained by the camshaft reception hole.

The seal member prevents fuel in the cam chamber from leaking outside through the camshaft reception hole.

Fuel is supplied to the cam chamber in liquid form to lubricate the cam. In such a case, the pressure inside the cam chamber is high, especially if the fuel is a liquefied gas fuel.

In this regard, a known technique is to provide the seal member in two stages so as to prevent fuel from leaking out of the housing. In other words, two seal members are provided on an outer periphery of the camshaft within the camshaft reception hole. These two seal members are spaced away from each other in an axial direction.

Of these two seal members, a first seal member is closer toward the cam chamber, and a second seal member is farther from the cam chamber. A gap between the first seal member and the second seal member is referred to as an inter-seal space.

However, even if the seal member is provided in two stages in this manner, the pressure limit of each seal member is limited. If the first seal member is unable to withstand the pressure in the cam chamber, the fuel will pass through the first seal member and leak into the inter-seal space. Then, the pressure in the inter-seal space will rise, and may ultimately result in the fuel passing through the second seal member to leak to the outside.

JP 2003-206825 A discloses a technique of connecting the inter-seal space to a purge tank to collect fuel in the purge tank. However, this technique lacks versatility with respect to devices that do not include a purge tank.

Accordingly, it is preferable to collect fuel in a fuel tank, which is always provided. However, if the fuel tank is simply connected to the inter-seal space, the pressure in the fuel tank is high, and thus it may be difficult to collect the fuel.

Further, if the fuel tank is simply connected to the inter-seal space, the maximum allowable pressure of the fuel tank may be applied on the seal members. Accordingly, if the pressure limit of the seal members is not designed to withstand the maximum allowable pressure of the fuel tank, then fuel may actually leak from the fuel tank instead. However, the maximum allowable pressure of the fuel tank is generally very high, and therefore it may be unrealistic to design such a seal member.

Accordingly, in order to collect fuel in the fuel tank, instead of simply connecting the fuel tank to the inter-seal space, an appropriate solution is needed.

SUMMARY

In view of the above, an object of the present disclosure is to provide a fuel supply device including two seal members disposed along an axial direction and configured to avoid fuel leaking from a cam chamber to outside along the periphery of a camshaft, such that fuel leaking into a space between the two seal members (i.e., an inter-seal space) may be collected in a fuel tank.

A fuel supply device according to the present disclosure includes a fuel tank, a feed pump, a high pressure pump, a leaked fuel collection unit, and a check valve.

The fuel tank stores liquefied gas fuel as a fuel.

The feed pump distributes the fuel from the fuel tank.

The high pressure pump supplies the fuel in a pressurized state to an internal-combustion engine.

The high pressure pump includes a pump chamber, a plunger, a camshaft, a cam, a housing, a camshaft reception hole, a first seal member, and a seal member.

The feed pump supplies the fuel to the pump chamber.

The plunger reciprocates to pressurize the fuel in the pump chamber.

The camshaft is rotatably driven by the internal combustion engine.

The cam is disposed on the camshaft to drive the plunger.

The housing forms a cam chamber housing the cam, the cam chamber being supplied with fuel for lubricating the cam.

The camshaft reception hole is formed in the housing and penetrates from inside of the cam chamber to outside of the cam chamber, the camshaft being inserted into and supported by the camshaft reception hole.

The first seal member and the second seal member are mounted on an outer peripheral of the camshaft within the camshaft reception hole to prevent the fuel in the cam chamber from leaking out through the camshaft reception hole.

Here, the first seal member is spaced away from the second seal member in an axial direction such that the first seal member is closer toward the cam chamber than the second seal member is to the cam chamber, thereby forming an inter-seal space between the first seal member and the second seal member.

The leaked fuel collection unit is configured to, when the fuel passes through the first seal member to leak out of the cam chamber into the inter-seal space, suck in the fuel to extract the fuel from the inter-seal space, then pressurize and return the fuel to the fuel tank.

The check valve prevents the fuel from flowing in reverse from the fuel tank to the inter-seal space.

Accordingly, regardless of the pressure in the fuel tank and the pressure in the inter-seal space, fuel that leaks into the inter-seal space may be actively returned to the fuel tank. Further, the check valve prevents pressure in the fuel tank from acting on the seal members. Accordingly, fuel that leaks into the inter-seal space may be collected into the fuel tank.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

A plurality embodiments of the present disclosure will be explained below.

First Embodiment

A fuel supply device 1 of the first embodiment will be explained with reference to FIGS. 1 to 5.

The fuel supply device 1 may be, for example, used for supplying fuel to a diesel engine. In the present embodiment, liquefied gas fuel (for example, dimethyl ether fuel, or "DME" fuel) is used as the fuel.

Figure 2:
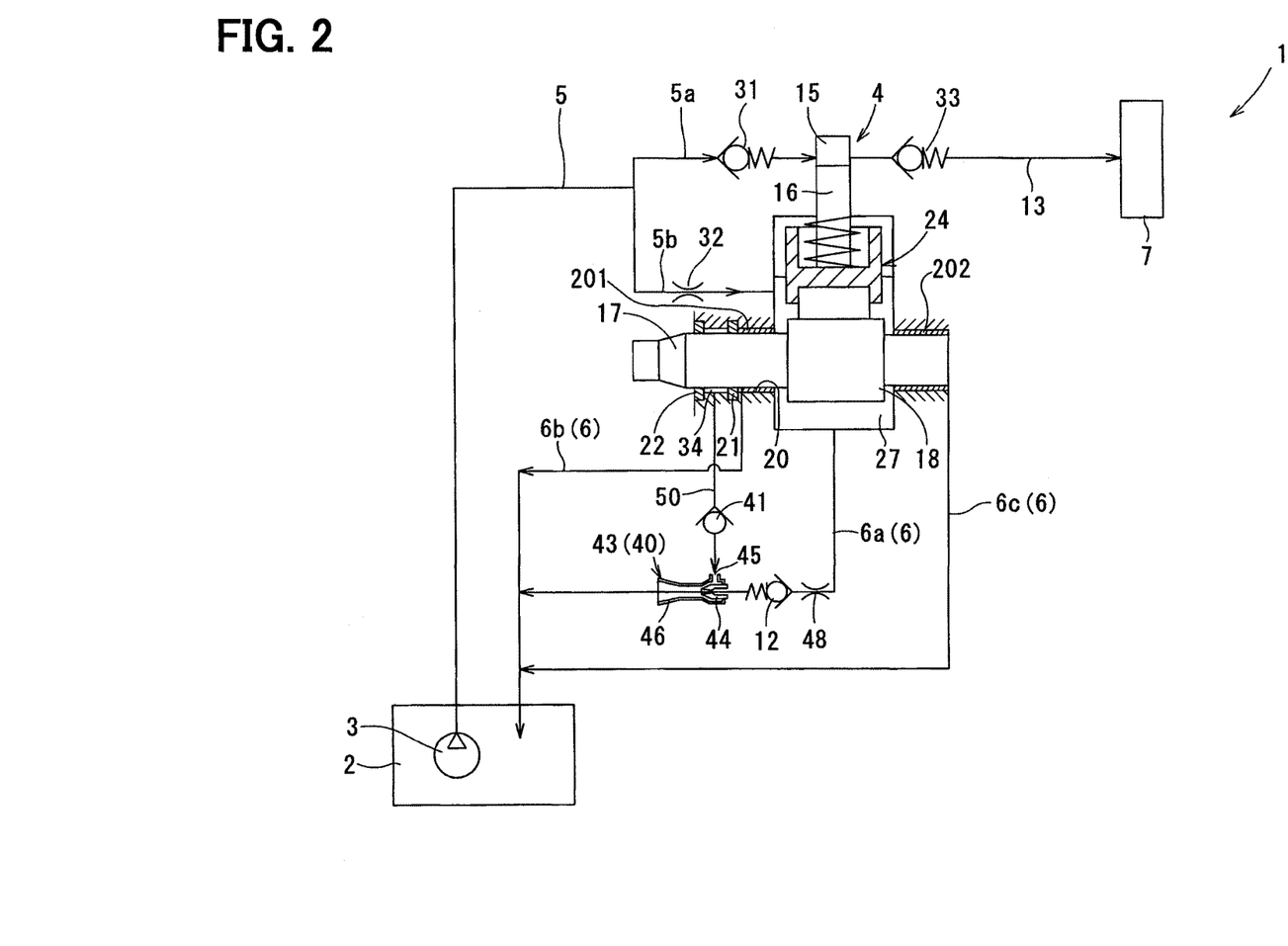
FIG. 2 is an overall configuration view of a fuel supply device.

As shown in FIG. 2, the fuel supply device 1 includes a fuel tank 2, a feed pump 3, a high pressure pump 4, a feed passage 5, a return passage 6, a common rail 7, and an injector (not illustrated).

The fuel tank 2 stores the fuel. The fuel inside the fuel tank 2 is pressurized and stored in liquid form.

The feed pump 3 may be arranged within the fuel tank 2. The feed pump 3 draws the fuel, and then supplies the fuel to the high pressure pump 4 through the feed passage 5.

The feed pump 3 is equipped with a feed pressure regulator that regulates a fuel supply pressure (or "feed pressure").

The high pressure pump 4 pressurizes the fuel, and then discharges the fuel such that the fuel is stored in the common rail 7 at a target pressure. Here, the target pressure is set according to engine conditions. The configuration of the high pressure pump 4 will be explained in detail later.

The feed passage 5 is a low pressure passage that guides fuel from the feed pump 3 to the high pressure pump 4.

The return passage 6 is a low pressure passage that returns return fuel from the high pressure pump 4 to the fuel tank 2. An overflow valve (OFV) 12 is provided in the return passage 6. The OFV 12 is a valve device that opens at a predetermined valve-opening pressure to allow excess fuel to flow to the fuel tank 2.

The common rail 7 is supplied with pressurized high pressure fuel from the high pressure pump 4 through a high pressure passage 13. Then, the common rail 7 stores the received fuel in a high pressure state.

Further, the common rail 7 is connected to the injector, and supplies the fuel to the injector. In other words, the common rail 7 functions as an accumulator that stores high pressure fuel, and also functions as a dispenser that distributes the high pressure fuel to the injector.

Figure 1:
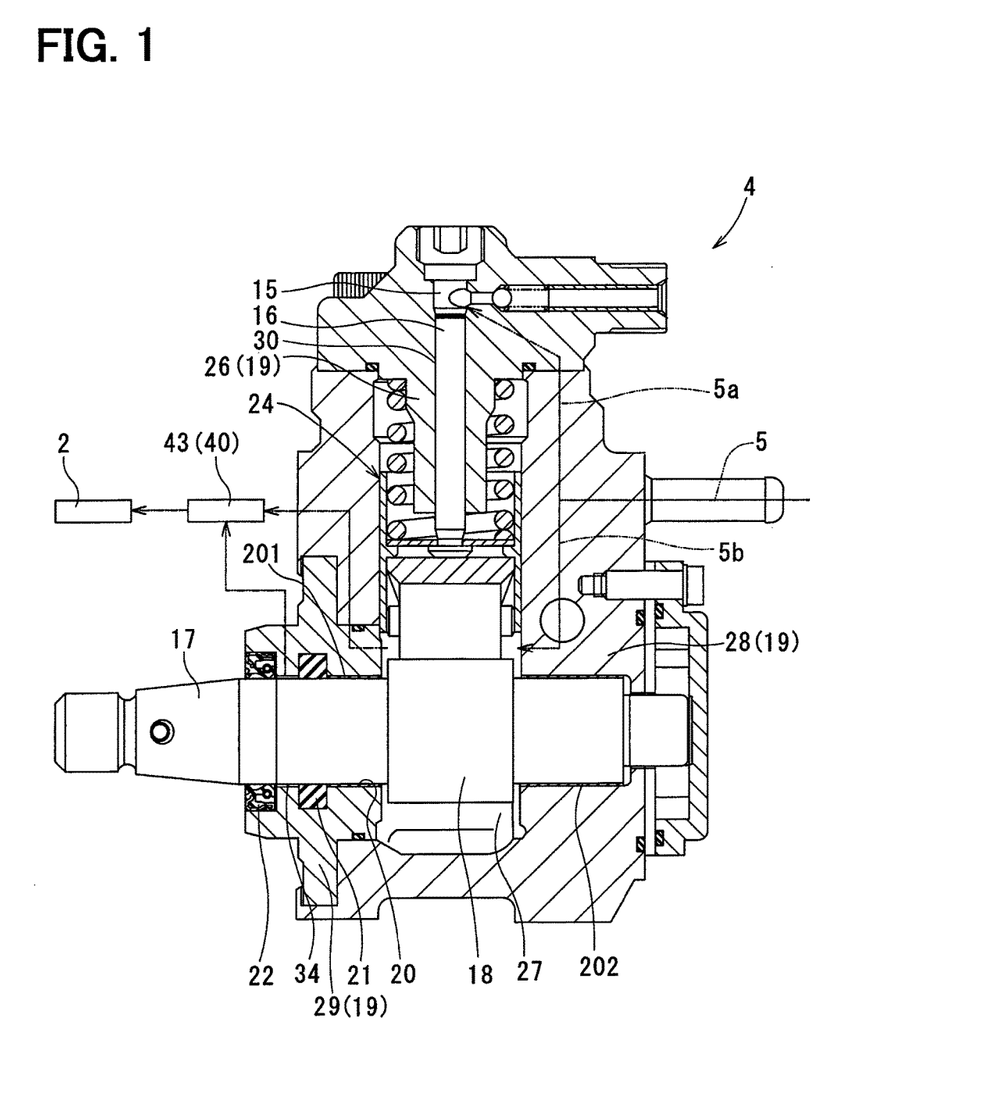
FIG. 1 is an outline view of a fuel supply device including a cross section view of a high pressure pump.

Next, the configuration of the high pressure pump 4 will be explained with reference to FIGS. 1 and 2.

The high pressure pump 4 includes a pump chamber 15, a plunger 16, a camshaft 17, a cam 18, a housing 19, a camshaft reception hole 20, and two seal members (a first seal member 21, and a second seal member 22).

Fuel from the feed pump 3 is supplied into a space formed by the pump chamber 15. The fuel is then pressurized inside the pump chamber 15 by the plunger 16.

The plunger 16 reciprocates in order to pressurize the fuel within the pump chamber 15.

The camshaft 17 is rotatably driven by an internal combustion engine.

The cam 18 is disposed on the camshaft 17, and drives the plunger 16. Specifically, rotation by the cam 18 is converted into a reciprocating motion through a tappet 24, and transmitted to the plunger 16.

The housing 19 includes a cylinder body 26, a main body 28, and a bearing body 29. The cylinder body 26 forms a space that houses the plunger 16 and allows the plunger 16 to reciprocate. The main body 28 forms a cam chamber 27 that houses the cam 18.

Specifically, the cylinder body 26 includes a cylinder hole 30 in which the plunger 16 is housed. One end of the cylinder hole 30 forms a pump chamber 15. Fuel is supplied to the pump chamber 15, and is compressed within the pump chamber 15 by the reciprocation of the plunger 16.

The feed passage 5 includes a plurality of paths. For example, the feed passage 5 includes a path 5a that supplies fuel from the feed pump 3 to the pump chamber 15, and a path 5b that supplies fuel from the feed pump 3 to the cam chamber 27.

An intake valve 31 is disposed in the path 5a to open and close the path 5a.

A choke 32 is disposed in the path 5b to set the flow rate of fuel flowing in the path 5b.

The fuel supplied to the pump chamber 15 is pressurized in the pump chamber 15 by the plunger 16, and discharged in a pressurized state to the common rail 7 through the high pressure passage 13. Further, a discharge valve 33 is disposed in the high pressure passage 13 to open and close the high pressure passage 13.

The cam chamber 27 formed in the main body 28 houses the cam 18. The path 5b supplies fuel into the cam chamber 27. Then, the fuel in the cam chamber 27 is used as lubrication oil for the cam 18.

The camshaft reception hole 20 is formed in the main body 28, and penetrates from inside of the cam chamber 27 to outside of the cam chamber 27. The camshaft 17 is inserted into and supported by the camshaft reception hole 20.

Bushings 201, 202 are press fit into the camshaft reception hole 20. One end of the camshaft 17 in the axial direction (i.e., the portion of the camshaft 17 closer toward one end in the axial direction than the cam 18) is inserted into the bushing 201, and the other end of the camshaft 17 in the axial direction (i.e., the portion of the camshaft 17 closer toward the other end in the axial direction than the cam 18) is inserted into the bushing 202.

The first seal member 21 and the second seal member 22 are disposed to prevent fuel in the cam chamber 27 from leaking out of the housing 19 through a gap around the camshaft 17 (i.e., a gap between the bushing 201 and the camshaft 17).

In other words, the first seal member 21 and the second seal member 22 form an axial seal on the camshaft 17, to prevent fuel from leaking through a gap between the outer surface of the camshaft 17 and the inner surface of the bushing 201.

The first seal member 21 and the second seal member 22 are ring-shaped rubber seals (but may also be resin seals or metal seals instead), and are mounted on the outer periphery on the camshaft 17 within the camshaft reception hole 20. Here, the first seal member 21 and the second seal member 22 are closer toward the one end in the axial direction (i.e., further away from the cam chamber 27) than the bushing 201 is. Further, the first seal member 21 and the second seal member 22 are mounted on the camshaft 17 so as to be spaced away from each other. The first seal member 21 is closer toward the cam chamber 27 than the second seal member 22 is. Accordingly, a space is formed between the first seal member 21 and the second seal member 22. This space is referred to as an inter-seal space 34.

The inner circumferential surfaces of the first seal member 21 and the second seal member 22 are in contact with the outer circumferential surface of the camshaft 17. Further, the outer circumferential surfaces of the first seal member 21 and the second seal member 22 are in contact with the inner circumferential surface of the camshaft reception hole 20. Accordingly, fuel is prevent from leaking through a gap between the inner circumferential surface of the camshaft reception hole 20 and the outer circumferential surface of the camshaft 17.

Figure 3:
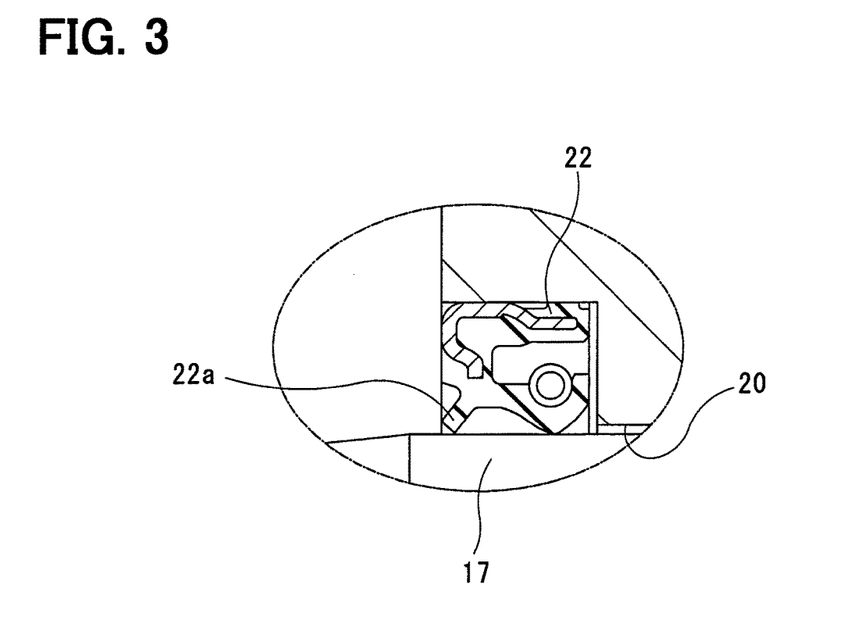
FIG. 3 is a cross section view of a second seal member.

As shown in FIG. 3, the second seal member 22 includes a lip 22a that prevents foreign matter from entering an opening of the camshaft reception hole 20 that faces away from the cam chamber 27.

Figure 4A:
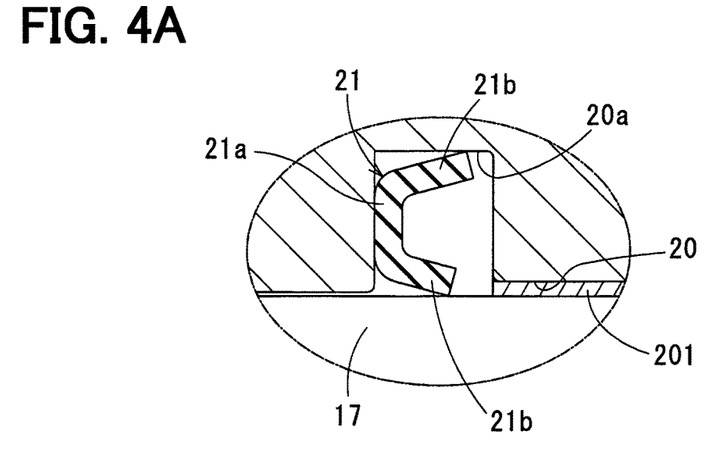
FIG. 4A is a cross section view of a first seal member.

The first seal member 21 is disposed in a circumferential groove 20a formed in the inner circumferential surface of the camshaft reception hole 20. For example, as shown in FIG. 4A, the first seal member 21 may have a U-shaped cross section. In other words, the first seal member 21 may include an annular portion 21a and leg portions 21b. The annular portion 21a is formed as a ring. At either end of the annular portion 21a in the radial direction, one of the leg portions 21b protrudes out toward the cam chamber 27.

Figure 4B:
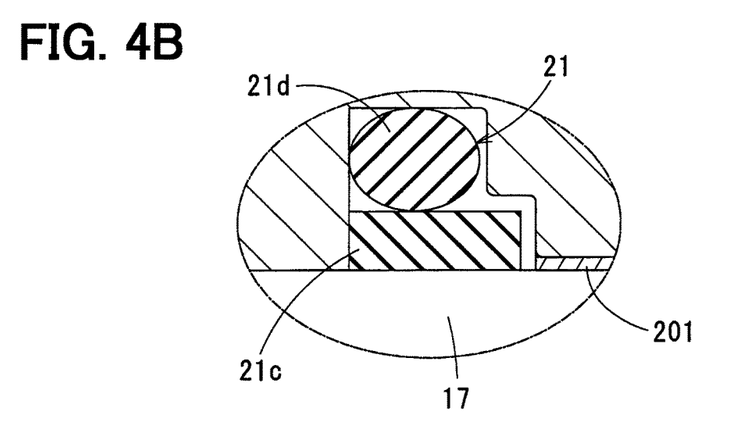
FIG. 4B is a cross section view of a first seal member.

Further, as shown in FIG. 4B, the first seal member 21 may instead be formed from a band seal 21c and an O-ring 21d. The band seal 21c is a belt mounted on the outer circumferential surface of the camshaft 17. The O-ring 21d is mounted on the outer periphery of the band seal 21c.

Figure 4C:
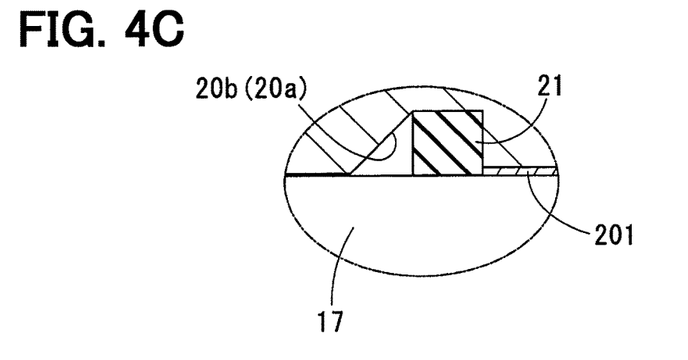
FIG. 4C is a cross section view of a first seal member.

Further, as shown in FIG. 4C, the first seal member 21 may instead have a rectangular cross section. In this case, the circumferential groove 20a may have a tapered portion 20b that decreases in groove depth in a direction away from the cam chamber 27. As a result, even if pressure from the cam chamber 27 is applied on the first seal member 21, the tapered portion 20b suppresses the first seal member 21 from moving away from the cam chamber 27.

The fuel supply device 1 further includes a leaked fuel collection unit 40 and a check valve 41. When fuel passes through the first seal member 21 and leaks from the cam chamber 27 into the inter-seal space 34, the leaked fuel collection unit 40 sucks in this fuel to extract this fuel from the inter-seal space 34. Then, the leaked fuel collection unit 40 pressurizes the fuel to return the fuel to the fuel tank 2. The check valve 41 prevents fuel in the fuel tank 2 from reverse flowing into the inter-seal space 34.

Due to the pressure in the cam chamber 27, fuel may leak through a gap between the first seal member 21 and the camshaft 17, thus leaking from the cam chamber 27 and into the inter-seal space 34. When leaked fuel is collected in the inter-seal space 34, the pressure in the inter-seal space 34 increases. As a result, there is a chance the fuel may break through the second seal member 22 to leak to the outside. For example, if a DME fuel is supplied to the cam chamber 27 in liquid form, the pressure in the cam chamber 27 may reach 3 MPa. In the case of a rubber seal, the second seal member 22 typically has a pressure limit of 100 kPa to 1 MPa. Accordingly, if leaked fuel is accumulated in the inter-seal space 34, there is a chance of the leaked fuel exceeding the pressure limit of the second seal member 22.

In this regard, according to the present embodiment, any fuel accumulated in the inter-seal space 34 is actively collected by the leaked fuel collection unit 40, such that the leaked fuel in the inter-seal space 34 does not reach a pressure exceeding the pressure limit of the second seal member 22.

This configuration is explained in detail below.

In the present embodiment, the leaked fuel collection unit 40 includes an ejector 43.

Figure 5:
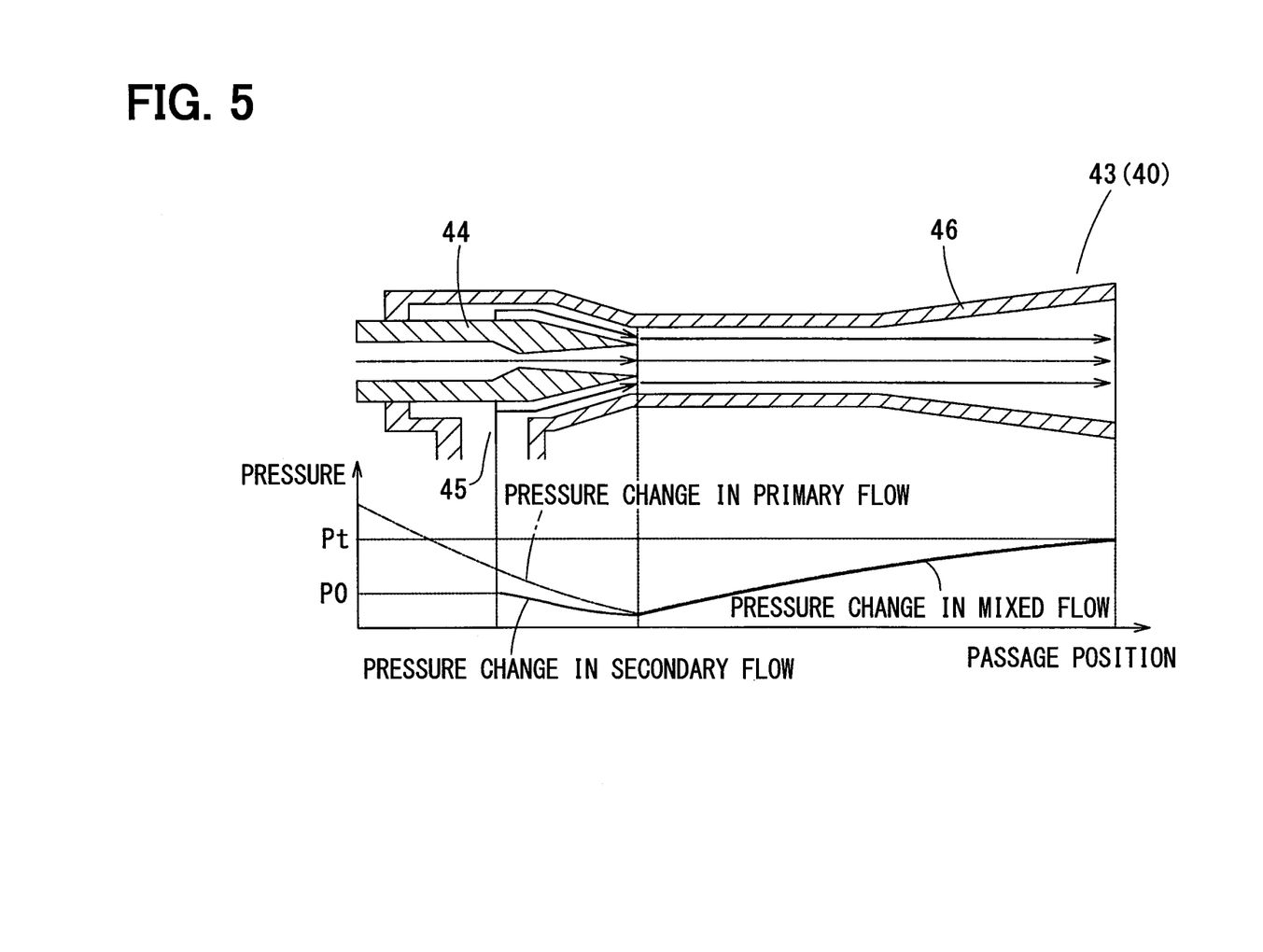
FIG. 5 is an explanatory view showing a configuration of an ejector and changes in pressure therealong.

The ejector 43 includes a nozzle 44, a inlet 45, and a diffuser 46 (see FIGS. 2 and 5). A fluid is expelled at high speeds by the nozzle 44. Due to the discharge from the nozzle 44, pressure is reduced and an external fluid is sucked in by the inlet 45. The fluid sucked in by the inlet 45 (a secondary flow) is merged with the fluid discharged by the nozzle 44 (a primary flow), then pressurized and discharged by the diffuser 46.

In the present embodiment, the ejector 43 is disposed in the middle of the return passage 6. In other words, the return fuel flows from the high pressure pump 4 into nozzle 44, then the fuel discharged from the diffuser 46 is returned to the fuel tank 2.

The return passage 6 includes a plurality of paths that go from the cam chamber 27 to the fuel tank 2. Specifically, the return passage 6 includes a path 6a, a path 6b, and a path 6c. The ejector 43 is disposed in the path 6a. Further, the ejector 43 is disposed downstream of the OFV 12. Further, a choke 48 is disposed in the path 6a and upstream of the OFV 12 to set the flow rate of the return fuel. The valve-opening pressure of the OFV 12 is set to a pressure that maintains the fuel in the return passage 6 in a liquid state.

When fuel leaks through the gap between the bushing 201 and the camshaft 17 to just before the first seal member 21, the path 6b allows this fuel to be directly collected into the fuel tank 2. Further, when fuel leaks through a gap between the bushing 202 and the camshaft 17, the path 6c allows this fuel to be directly collected into the fuel tank 2. If the pressure of the leaked fuel is greater than the pressure in the fuel tank 2, the leaked fuel is naturally collected by the path 6b and the path 6c. However, the amount of return fuel flowing through the path 6b and the path 6c is small, and thus does not act as a driving flow for the ejector 43.

A passage 50 connects the inlet 45 with the inter-seal space 34. The check valve 41 is disposed in the passage 50, and as a result, fuel is prevent from flowing in reverse from the fuel tank 2 to the inter-seal space 34. Alternatively, the check valve 41 may be implemented as a reverse flow protection device in the ejector 43.

As described above, the fuel supply device 1 of the present embodiment includes the leaked fuel collection unit 40 and the check valve 41. The leaked fuel collection unit 40 is configured to suck in fuel which leaks out from cam chamber 27, through the first seal member 21, and into the inter-seal space 34. The leaked fuel collection unit 40 then pressurizes the fuel and returns the fuel to the fuel tank 2. The check valve 41 prevents the fuel from reverse flowing from the fuel tank 2 to the inter-seal space 34.

In the present embodiment, the leaked fuel collection unit 40 includes the ejector 43, which is disposed in the middle of the return passage 6.

Accordingly, the return fuel from the high pressure pump 4 acts as a driving flow, and fuel in the inter-seal space 34 can be sucked in by the ejector 43.

Then, fuel from the inter-seal space 34 and fuel from the nozzle 44 are mixed together and pressurized by the diffuser 46.

Specifically, as shown in FIG. 5, even if a pressure P0 at the inlet 45 (i.e., the pressure of the inter-seal space 34) is lower than a pressure Pt of the fuel tank 2, the pressure P0 is increased to the pressure Pt by the diffuser 46. Accordingly, the fuel may be collected into the fuel tank 2.

Further, it should be noted that the fuel leaking into the inter-seal space 34 may be in gas form or liquid form. The diffuser 46 is provided such that in either case, the fuel is pressurized by the diffuser 46 into liquid form.

In other words, according to the present embodiment, fuel that leaks into the inter-seal space 34 may be actively returned into the fuel tank 2 regardless of the pressure in the fuel tank 2 and the pressure in the inter-seal space 34.

Further, due to the check valve 41, the pressure in the fuel tank 2 is prevented from being applied to the seal members 21, 22.

Accordingly, fuel that leaks into the inter-seal space 34 may be collected, and fuel may be suppressed from leaking out of the housing 19.

Further, when the engine is stopped and the feed pump 3 is stopped, by controlling the OFV 12 to open, the ejector 43 may be operated by an overflow created by fuel pressure in the cam chamber 27, and thereby suck in fuel from the inter-seal space 34. This overflow is created by fuel overflowing from the cam chamber 27, upon which the overflow fuel is returned to the fuel tank 2 through the return passage 6. When the overflow terminates and the ejector 43 stops operating, the check valve 41 can prevent pressure in the fuel tank 2 from acting on the seal members 21, 22.

Second Embodiment

A second embodiment will be explained with reference to FIG. 6, with a focus on differences from the first embodiment.

Further, elements which are the same or substantially the same as those of the first embodiment are denoted with the same reference numerals.

In the present embodiment, a low pressure passage 52 connects the inter-seal space 34 to a low pressure space that has a lower pressure than the fuel tank 2. Further, a safety valve 53 is disposed in the low pressure passage 52. The safety valve 53 is configured to open when the pressure in the inter-seal space 34 is at or above a predetermined pressure.

Figure 6:
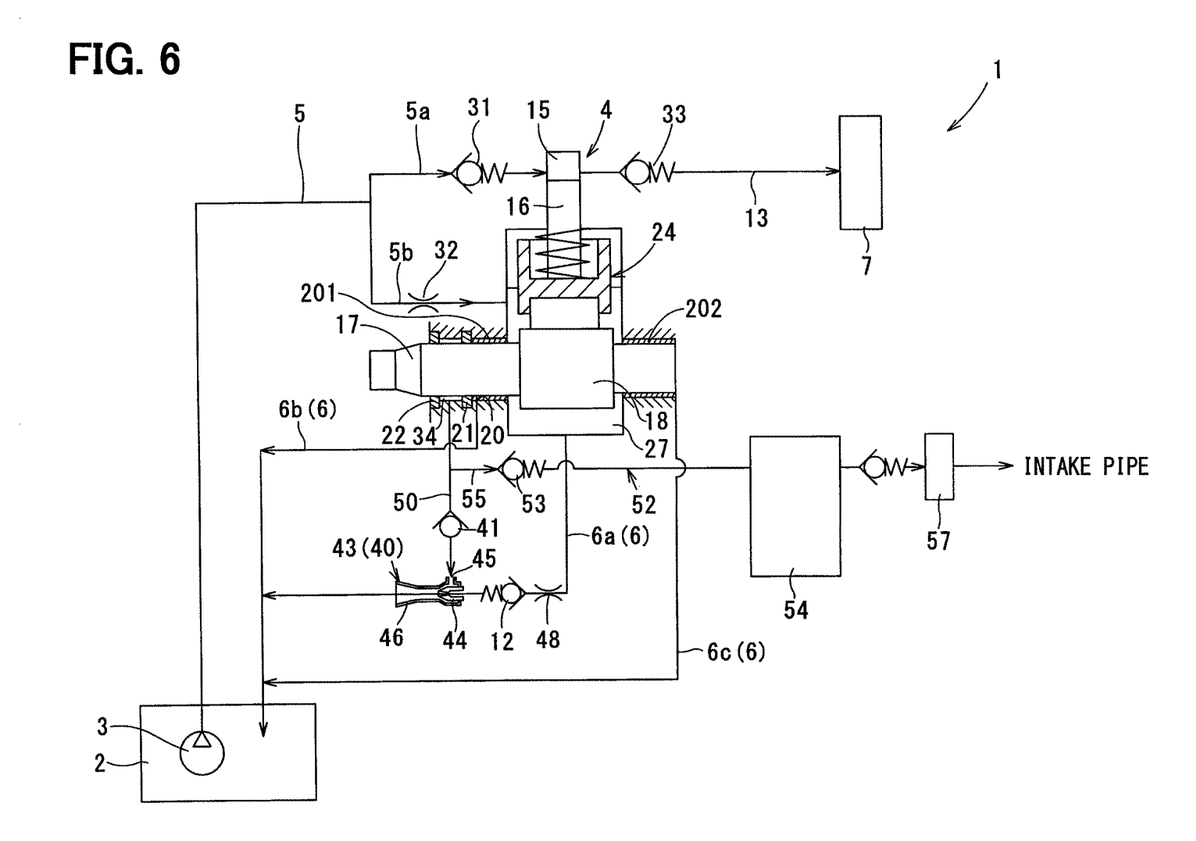
FIG. 6 is an overall configuration view of a fuel supply device.

As shown in FIG. 6, the fuel supply device 1 of the present embodiment includes a passage 55 that forks from the middle of the passage 50 and that connects to a purge tank 54. The purge tank 54 acts as the low pressure space. In other words, the passage 55 and a portion of the passage 50 forms the low pressure passage 52, and this low pressure passage 52 connects the inter-seal space 34 to the purge tank 54.

The safety valve 53, which opens and closes the low pressure passage 52, is disposed in the middle of the low pressure passage 52.

The safety valve 53 is configured to open when the pressure in the inter-seal space 34 is at or above a predetermined pressure.

Then, an intake pipe is connected through a canister 57 downstream of the purge tank 54.

The present embodiment exhibits at least the following effects.

When the engine is stopped, even if the fuel leaks into the inter-seal space 34 and the pressure in the inter-seal space 34 rises, the fuel may be expelled through the low pressure passage 52 into the low pressure space (which is the purge tank 54 in the present embodiment).

For example, when a so-called "dead soak" occurs, the pressure in the cam chamber 27 tends to rise, and when fuel leaks into the inter-seal space 34, the pressure in the inter-seal space 34 also rises. However, since the engine is stopped, the ejector 43 is not operating. In other words, fuel cannot be collected through the ejector 43 and into the fuel tank 2.

In this regard, the present embodiment provides a pressure relief device such that when the engine is stopped and the pressure in the inter-seal space 34 reaches or exceeds the predetermined pressure, fuel may be extracted from the inter-seal space 34 and into the low pressure space.

In other words, when the pressure in the inter-seal space 34 reaches or exceeds the predetermined pressure, the safety valve 53 opens, and fuel in the inter-seal space 34 flow into the purge tank 54. Then, the fuel flowing into the purge tank 54 is adsorbed in the canister 57. When the engine begins operating again, the fuel is released from the canister 57 and flown into the intake pipe.

Further, when the engine is operating, the inter-seal space 34 is depressurized due to the leaked fuel collection unit 40, and thus the safety valve 53 does not reach the valve-opening predetermined pressure. However, if an abnormality occurs such that the leaked fuel collection unit 40 is unable to collect fuel while the engine is in operation, the pressure in the inter-seal space 34 rises to reach or exceed the predetermined pressure. At that time, the safety valve 53 opens, and fuel in the inter-seal space 34 flows into the purge tank 54. In other words, a fail-safe mechanism is provided for when the engine is operating.

Further, in the present embodiment, the low pressure space connected to the inter-seal space 34 is the purge tank 54. However, this is not intended to be limiting, and the low pressure space may be an intake pipe instead, for example.

Third Embodiment

Figure 7:
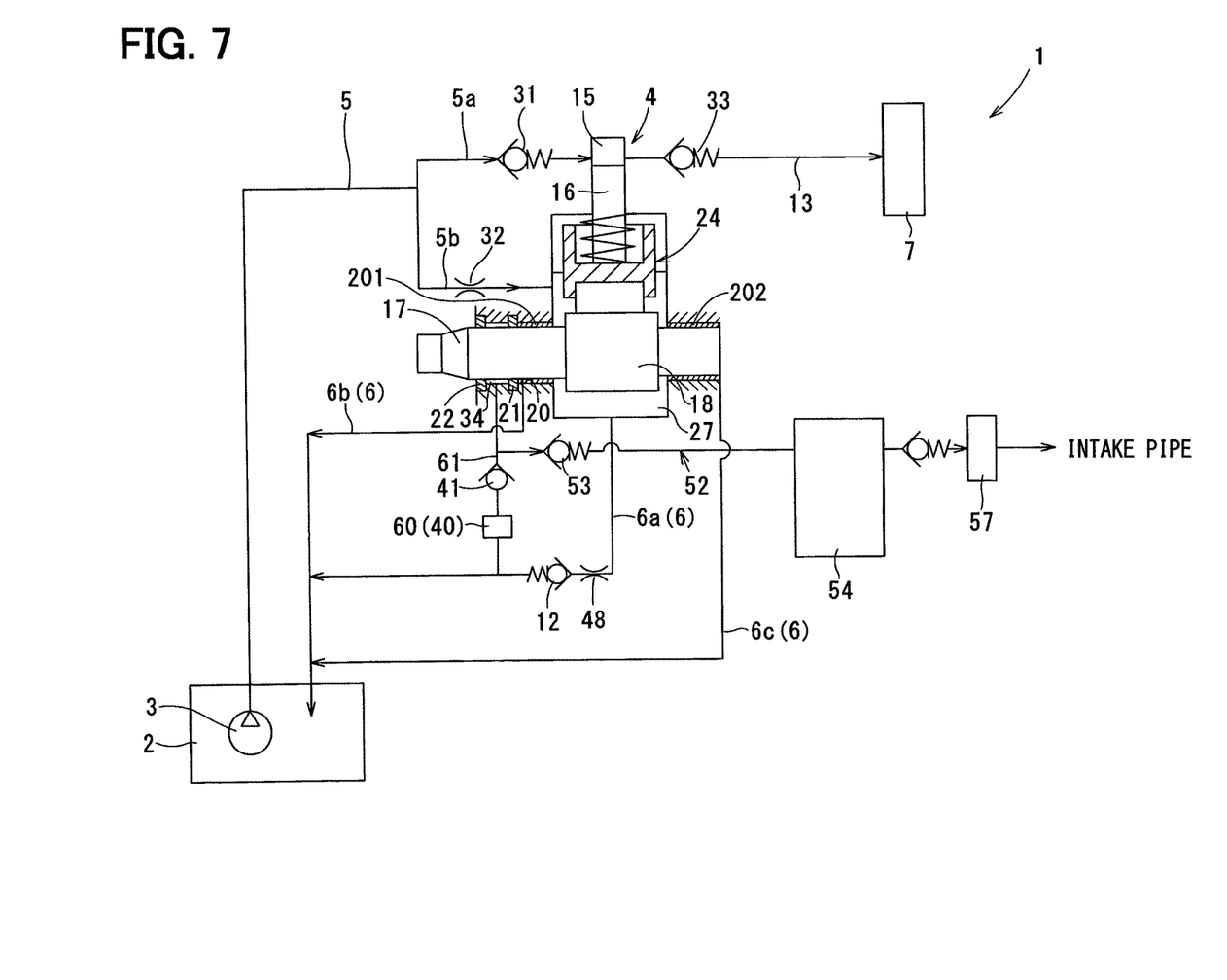
FIG. 7 is an overall configuration view of a fuel supply device.

A third embodiment will be explained with reference to FIG. 7, with a focus on differences from the first embodiment.

Further, elements which are the same or substantially the same as those of the first embodiment are denoted with the same reference numerals.

In the present embodiment, the leaked fuel collection unit 40 includes a pump 60.

The pump 60 is disposed in a communication passage 61 that fluidly communicates the inter-seal space 34 with the fuel tank 2. Further, the pump 60 sucks in fuel from the inter-seal space 34 and pressurizes the fuel. The pump 60 may be driven by a crankshaft or some other motive power source.

The check valve 41 and the pump 60 are both disposed in the middle of the communication passage 61 that fluidly communicates the inter-seal space 34 with the fuel tank 2. Alternatively, the check valve 41 may be implemented as a reverse flow protection device in the pump 60.

Downstream of the pump 60 (i.e., toward the fuel tank 2), the communication passage 61 merges with a portion of the return passage 6 (i.e., the path 6a). Further, the choke 48 is disposed in the path 6a and upstream of the OFV 12 to set the flow rate of the return fuel.

Alternatively, the communication passage 61 may not merge with the path 6a instead.

Further, similar to the second embodiment, the present embodiment may include a pressure relief device such that when the engine is stopped and the pressure in the inter-seal space 34 reaches or exceeds a predetermined pressure, fuel may be extracted from the inter-seal space 34 and into a low pressure space.

In other words, the present embodiment may provide the low pressure passage 52 which forks from the communication passage 61 and connects to the purge tank 54, and provide the safety valve 53 that opens and closes the low pressure passage 52.

Other Embodiments

In the first embodiment, the return fuel from the high pressure pump 4 flows into the nozzle 44 of the ejector 43. Alternatively, fuel may flow from the feed pump 3 instead. In other words, the ejector 43 may be disposed in a passage provided to return fuel from the feed passage 5 to the fuel tank 2 while bypassing the high pressure pump 4.

Thus, the feed fuel would act as the driving flow that causes the ejector 43 to suck in fuel from the inter-seal space 34.

Further alternatively, return fuel may flow from an injector (not illustrated) to the nozzle 44 of the ejector 43 instead.

In other words, return fuel from the injector would act as the driving flow that causes the ejector 43 to suck in fuel from the inter-seal space 34.

The invention claimed is:

1. A fuel supply device, comprising:
a fuel tank that stores liquefied gas fuel as a fuel;
a feed pump that distributes the fuel from the fuel tank;
a high pressure pump that supplies the fuel in a pressurized state to an internal-combustion engine, the high pressure pump including
  a pump chamber, the feed pump supplying the fuel to the pump chamber,
  a plunger that reciprocates to pressurize the fuel in the pump chamber,
  a camshaft that is rotatably driven by the internal combustion engine,
  a cam disposed on the camshaft to drive the plunger,
  a housing that forms a cam chamber housing the cam, the cam chamber being supplied with fuel for lubricating the cam,
  a camshaft reception hole formed in the housing that penetrates from inside of the cam chamber to outside of the cam chamber, the camshaft being inserted into and supported by the camshaft reception hole, and
  a first seal member and a second seal member that are mounted on an outer peripheral of the camshaft within the camshaft reception hole to prevent the fuel in the cam chamber from leaking out through the camshaft reception hole, the first seal member being spaced away from the second seal member in an axial direction such that the first seal member is closer toward the cam chamber than the second seal member is to the cam chamber, thereby forming an inter-seal space between the first seal member and the second seal member;
a leaked fuel collection unit that, when the fuel passes through the first seal member to leak out of the cam chamber into the inter-seal space, sucks in the fuel to extract the fuel from the inter-seal space, then pressurizes and returns the fuel to the fuel tank; and
a check valve that prevents the fuel from flowing in reverse from the fuel tank to the inter-seal space, wherein
the inter-seal space is connected to a purge tank by a low pressure passage, the purge tank having a lower pressure than the fuel tank, and
a safety valve is disposed in the low pressure passage, the safety valve being configured to open when a pressure in the inter-seal space reaches or exceeds a predetermined pressure.

2. A fuel supply device, comprising:
a fuel tank that stores liquefied gas fuel as a fuel;
a feed pump that distributes the fuel from the fuel tank;
a high pressure pump that supplies the fuel in a pressurized state to an internal-combustion engine, the high pressure pump including
  a pump chamber, the feed pump supplying the fuel to the pump chamber,
  a plunger that reciprocates to pressurize the fuel in the pump chamber,
  a camshaft that is rotatably driven by the internal combustion engine,
  a cam disposed on the camshaft to drive the plunger,
  a housing that forms a cam chamber housing the cam, the cam chamber being supplied with fuel for lubricating the cam,
  a camshaft reception hole formed in the housing that penetrates from inside of the cam chamber to outside of the cam chamber, the camshaft being inserted into and supported by the camshaft reception hole, and
  a first seal member and a second seal member that are mounted on an outer peripheral of the camshaft within the camshaft reception hole to prevent the fuel in the cam chamber from leaking out through the camshaft reception hole, the first seal member being spaced away from the second seal member in an axial direction such that the first seal member is closer toward the cam chamber than the second seal member is to the cam chamber, thereby forming an inter-seal space between the first seal member and the second seal member;
a leaked fuel collection unit that, when the fuel passes through the first seal member to leak out of the cam chamber into the inter-seal space, sucks in the fuel to extract the fuel from the inter-seal space, then pressurizes and returns the fuel to the fuel tank; and
a check valve that prevents the fuel from flowing in reverse from the fuel tank to the inter-seal space, wherein
the leaked fuel collection unit includes an ejector disposed in a return passage, the ejector including an inlet that opens into the inter-seal space, when an overflow fuel overflows from the pump chamber, the return passage returns the overflow fuel to the fuel tank, and the ejector uses a fuel flow of the return passage to suck in the fuel in the inter-seal space through the inlet, then merges and pressurizes the sucked in fuel with the overflow fuel flowing in the return passage.

3. The fuel supply device of claim 1, wherein the leaked fuel collection unit includes a pump disposed in a communication passage that connects the inter-seal space to the fuel tank, the pump being configured to suck in the fuel in the inter-seal space to pressurize the fuel.

\* \* \* \* \*